# 2,860,122

PREPARATION OF POLYVINYL BUTYRAL

Frank Berardinelli, South Orange, Richard E. Davies, Ridgewood, and Blanche B. White, Summit, N. J., assignors to Celanese Corporation of America, New York, N. Y., a corporation of Delaware No Drawing. Application December 9, 1954
Serial No. 474,286

8 Claims. (Cl. 260—73)

This invention relates to the preparation of polyvinyl acetals and relates more particularly to the preparation of polyvinyl acetals by a process using sulfuric acid as the catalyst.

As is well known in the art, polyvinyl acetals may be produced by the reaction of an aldehyde, e. g. propionaldehyde or butyraldehyde, with a suitable polyvinyl resin, e. g. a polyvinyl ester such as polyvinyl acetate or propionate, or a polyvinyl alcohol, in the presence of sulfuric acid as a catalyst. After the reaction is completed the product is neutralized by the addition of an alkali, such as sodium hydroxide, and then washed thoroughly with water to remove most of the water-soluble salts. Generally, in order to reduce the ash content of the polyvinyl acetals to a commercially acceptable figure, e. g. below 0.1% by weight, a great deal of washing of the material is necessary. In fact, in many cases it is practically impossible to reduce the ash content of the desired level by washing the neutralized polyvinyl acetal with water.

It is therefore an object of this invention to provide an improved process for the preparation of polyvinyl acetals of low ash content using sulfuric acid as the catalyst.

Another object of this invention is the provision of a new and economical process for neutralizing the sulfuric acid catalyst employed in the preparation of polyvinyl acetals.

A further object of this invention is to provide a novel process for the preparation of polyvinyl butyral by the reaction of a solution of polyvinyl acetate in methanol with butyraldehyde in the presence of sulfuric acid at elevated temperatures and superatmospheric pressures.

Other objects of this invention will be apparent from the following detailed description and claims.

In accordance with one aspect of this invention it has been found that the ash content and sulfate content of polyvinyl acetal resins produced in the presence of sulfuric acid may be greatly reduced by employing magnesium acetate to neutralize the sulfuric acid after the acetalization has proceeded to the desired extent.

As another feature of this invention, it has also been found that when the reaction to form polyvinyl butyral in methanol solution is carried out at a superatmospheric pressure of at least about 1.5 atmosphere (absolute), preferably about 10 to 40 pounds per square inch gauge and a temperature of at least 70° C., preferably about 75 to 100° C., rather than at atmospheric pressure at the boiling temperature of the solution, a much smaller amount of sulfuric acid is necessary to cause the reaction to proceed at the desired rate and to the desired extent and the product has a lower ash content and sulfate content.

In one preferred embodiment, the process of this invention is employed for the production of polyvinyl butyral by reacting polyvinyl acetate in methanol solution with butyraldehyde in the presence of sulfuric acid at the elevated temperature and under the superatmospheric pressure indicated above until there is obtained a reaction product having a butyral content, calculated as polyvinyl butyral, of at least about 70%, preferably at least 77%, by weight. Thereafter the reaction mixture, which is homogeneous, is neutralized by the addition of magnesium acetate and the poylvinyl butyral is precipitated by mixing the neutralized reaction mixture with water. The precipitated polyvinyl butyral is then washed with water to remove most of the water-soluble materials which may be present.

The improvement resulting from the use of magnesium acetate as the neutralizing agent is considerable. For example, when the process is carried out under otherwise identical conditions, employing sulfuric acid in the amount of 15% and higher based on the weight of polyvinyl acetate as the catalyst, the substitution of magnesium acetate for sodium hydroxide as the neutralizing agent reduces the ash content of the product by about 80% and the sulfate content by about 90%. Substitution of magnesium oxide for the magnesium acetate does not produce the desired results, yielding instead a product having a considerably higher ash and sulfate content.

In the process of this invention it is preferred to use polyvinyl acetate as the starting material. If desired, this polyvinyl acetate may be in the partially hydrolyzed form, e. g. polyvinyl acetate having an alcohol content of 20 to 90%, calculated as polyvinyl alcohol.

The amount of aldehyde used in the process of this invention may be varied. For example, polyvinyl butyral of high butyral content has been produced in accordance with this invention using 0.8 to 1.5 equivalents of butyraldehyde, i. e. 0.4 to 0.75 mole of butyraldehyde, per mole of polymerized vinyl acetate. However, it is desirable from an economic viewpoint to employ as little excess aldehyde as possible.

The amount of surfuric acid employed as the catalyst is preferably in the range of about 2.5% to 30%, based on the weight of polyvinyl acetate, the lower proportions being used when the temperature of reaction is in the upper part of the preferred range of temperatures, given above. The amount of magnesium acetate used is preferably stoichiometrically equal to, or slightly greater than, the amount of sulfuric acid, e. g. about 1 to 1.1 moles of magnesium acetate per mole of sulfuric acid.

The following examples are given to illustrate this invention further. All proportions are by weight unless otherwise indicated.

*Example I*

A mixture of 100 parts of polyvinyl acetate, 300 parts of methanol, 36 parts of butyraldehyde and 5 parts of sulfuric acid are heated under reflux at a temperature of 98 to 100° C. and a pressure of 37 pounds per square inch gauge. On this heating the ingredients form a solution. The heating is continued under the same conditions for 3.5 hours, after which there are added 7.6 parts of magnesium acetate, as a 25% solution in methanol, to neutralize the sulfuric acid. This quantity of magnesium acetate provides a 5% excess of magnesium acetate over the stoichiometric amount. The neutralized solution is mixed with water to precipitate the polyvinyl butyral which is then washed with water for 5 one-hour periods, fresh water being used for each wash and dried. The product has a butyral content of 78.4%, calculated as polyvinyl butyral, an acetate content of 0.4%, calculated as polyvinyl acetate, and an alcohol content of 21.2%, calculated as polyvinyl alcohol. Its ash content is 0.06% and its total sulfate content is 0.038%.

Example II

Example I is repeated except that 42.4 parts of butyraldehyde and 15 parts of sulfuric acid are used and the reaction is carried out at a temperature of 78–82° C. and a pressure of 14.5 pounds per square inch gauge for 4 hours. The quantity of magnesium acetate used is 5% in excess of the stoichiometric amount. There is obtained a product having a butyral content of 77.2%, an ash content of 0.07%, and a total sulfate content of 0.038%.

Example III

Example I is repeated except that 42.4 parts of butyraldehyde and 2.5 parts of sulfuric acid are used and the reaction is carried out for 7 hours. The quantity of magnesium acetate used is 5% in excess of the stoichiometric amount. The product has a butyral content of 80.25%, an ash content of 0.04% and a sulfate content of 0.012%.

Example IV

Example I is repeated except that 41.8 parts of butyraldehyde and 20 parts of sulfuric acid are employed and the reaction is carried out for 4 hours at a temperature of 75° C. and a pressure of 10 pounds per square inch gauge. The quantity of magnesium acetate used is 5% in excess of the stoichiometric amount.

It is to be understood that the foregoing detailed description is given merely by way of illustration and that many variations may be made therein without departing from the spirit of our invention.

Having described our invention what I desire to secure by Letters Patent is:

1. In the process for the production of a polyvinyl acetal in which an aldehyde is reacted in the presence of sulfuric acid with a polyvinyl resin selected from the group consisting of polyvinyl alcohols and polyvinyl esters which is reactive with said aldehyde to produce a polyvinyl acetal and in which as a result of said reaction an acidic solution of the polyvinyl acetal is produced, the improvement which comprises neutralizing said solution with magnesium acetate.

2. In the process for the production of polyvinyl acetal in which an aldehyde is reacted in the presence of sulfuric acid with a polyvinyl resin selected from the group consisting of polyvinyl alcohols and polyvinyl esters which is reactive with said aldehyde to produce a water-insoluble polyvinyl acetal and in which as a result of said reaction an acidic solution of said water-insoluble polyvinyl acetal is produced, the improvement which comprises neutralizing said solution with magnesium acetate, precipitating the water-insoluble polyvinyl acetal from the neutralized solution by the addition of water, and then washing the precipitated polyvinyl acetal with water.

3. Process for the production of polyvinyl butyral, which comprises reacting a polyvinyl resin selected from the group consisting of polyvinyl esters and polyvinyl alcohol with butyraldehyde in the presence of sulfuric acid to produce an acidic solution of polyvinyl butyral and neutralizing said solution with magnesium acetate.

4. Process for the production of polyvinyl butyral which comprises reacting a mixture of polyvinyl acetate, methanol, butyraldehyde and sulfuric acid until a solution of a polyvinyl butyral having a butyral content of at least 70%, calculated as polyvinyl butyral, is produced, neutralizing said solution with magnesium acetate, precipitating said polyvinyl butyral from the neutralized solution by the addition of water and washing said precipitated polyvinyl butyral.

5. Process as set forth in claim 4 in which the reaction of the butyraldehyde and polyvinyl acetate is carried out at a temperature of at least 70° C. and a pressure of at least 1.5 atmospheres absolute.

6. Process as set forth in claim 5 in which the pressure is about 10 to 40 pounds per square inch gauge and the temperature is about 70 to 100° C.

7. Process for the production of polyvinyl butyral which comprises reacting polyvinyl acetate and butyraldehyde in solution in methanol and in admixture with 2.5 to 30 parts by weight of sulfuric acid per 100 parts of polyvinyl acetate under a pressure of at least 1.5 atmospheres absolute and a temperature of at least 70° C. until a polyvinyl butyral product having a butyral content of at least 70%, calculated as polyvinyl butyral, is obtained in solution, and thereafter precipitating said polyvinyl butyral product from solution by the addition of water.

8. Process as set forth in claim 7 in which the pressure is 10 to 40 pounds per square inch, the temperature is 70 to 100° C. and the process is continued until the butyral content of the product is at least 77%.

References Cited in the file of this patent

UNITED STATES PATENTS

| | | |
|---|---|---|
| Re. 20,430 | Morrison et al. | June 29, 1937 |
| 1,725,362 | Matheson et al. | Aug. 20, 1929 |
| 2,007,557 | Blaikie et al. | July 9, 1935 |
| 2,157,384 | Davidson | May 9, 1939 |

FOREIGN PATENTS

| | | |
|---|---|---|
| 563,792 | Germany | Nov. 9, 1932 |